(12) United States Patent
Wu et al.

(10) Patent No.: US 8,015,133 B1
(45) Date of Patent: Sep. 6, 2011

(54) COMPUTER-IMPLEMENTED MODELING SYSTEMS AND METHODS FOR ANALYZING AND PREDICTING COMPUTER NETWORK INTRUSIONS

(75) Inventors: Lizhong Wu, San Diego, CA (US); Terrance Gordon Barker, Cardiff by the Sea, CA (US); Vijay S. Desai, San Diego, CA (US)

(73) Assignee: SAS Institute Inc., Cary, NC (US)

( * ) Notice: Subject to any disclaimer, the term of this patent is extended or adjusted under 35 U.S.C. 154(b) by 837 days.

(21) Appl. No.: 11/850,842

(22) Filed: Sep. 6, 2007

Related U.S. Application Data

(60) Provisional application No. 60/902,378, filed on Feb. 20, 2007.

(51) Int. Cl.
*G06N 3/02* (2006.01)
(52) U.S. Cl. .......................... 706/21; 709/223
(58) Field of Classification Search ................... 706/11, 706/47, 21; 348/143, 150
See application file for complete search history.

(56) References Cited

U.S. PATENT DOCUMENTS

| | | |
|---|---|---|
| 5,335,291 A | 8/1994 | Kramer et al. |
| 5,519,319 A | 5/1996 | Smith et al. |
| 5,650,722 A | 7/1997 | Smith et al. |
| 5,675,253 A | 10/1997 | Smith et al. |
| 5,677,955 A | 10/1997 | Doggett et al. |
| 5,761,442 A | 6/1998 | Barr et al. |
| 5,819,226 A | 10/1998 | Gopinathan et al. |
| 5,884,289 A | 3/1999 | Anderson et al. |
| 6,029,154 A | 2/2000 | Pettitt |
| 6,047,268 A | 4/2000 | Bartoli et al. |
| 6,064,990 A | 5/2000 | Goldsmith |
| 6,122,624 A | 9/2000 | Tetro et al. |
| 6,125,349 A | 9/2000 | Maher |
| 6,170,744 B1 | 1/2001 | Lee et al. |
| 6,330,546 B1 | 12/2001 | Gopinathan et al. |
| 6,388,592 B1 | 5/2002 | Natarajan |
| 6,453,206 B1 | 9/2002 | Soraghan et al. |
| 6,516,056 B1 | 2/2003 | Justice et al. |
| 6,549,861 B1 | 4/2003 | Mark et al. |
| 6,570,968 B1 | 5/2003 | Marchand et al. |
| 6,601,049 B1 | 7/2003 | Cooper |
| 6,631,212 B1 | 10/2003 | Luo et al. |
| 6,650,779 B2 | 11/2003 | Vachtesvanos et al. |
| 6,675,145 B1 | 1/2004 | Yehia et al. |
| 6,678,640 B2 | 1/2004 | Ishida et al. |
| 7,117,191 B2 | 10/2006 | Gavan et al. |
| 7,191,150 B1 | 3/2007 | Shao et al. |
| 7,269,516 B2 | 9/2007 | Brunner et al. |

(Continued)

OTHER PUBLICATIONS

Brause, Rudiger W., "Cascaded Vector Quantization by Non-Linear PCA Network Layers", IEEE, pp. 154-160 (1994).

(Continued)

*Primary Examiner* — Jeffrey A Gaffin
*Assistant Examiner* — Ola Olude-Afolabi
(74) *Attorney, Agent, or Firm* — Jones Day

(57) ABSTRACT

Computer-implemented systems and methods for analyzing activities associated with accesses of a computer network. A computer-implemented method can be configured to receive data related to the activities associated with the accesses of a computer network. The network activities data are segmented into a plurality of network activities segments. For each of the network activities segments, an anomaly detection predictive model is generated. The generated predictive models are for use in analyzing the activities associated with the computer network.

27 Claims, 14 Drawing Sheets

U.S. PATENT DOCUMENTS

| | | | |
|---|---|---|---|
| 7,403,922 | B1 | 7/2008 | Lewis et al. |
| 7,455,226 | B1 | 11/2008 | Hammond et al. |
| 7,461,048 | B2 | 12/2008 | Teverovskiy et al. |
| 7,467,119 | B2 | 12/2008 | Saidi et al. |
| 7,480,640 | B1 | 1/2009 | Elad et al. |
| 7,536,348 | B2 | 5/2009 | Shao et al. |
| 7,562,058 | B2 | 7/2009 | Pinto et al. |
| 7,580,798 | B2 | 8/2009 | Brunner et al. |
| 7,788,195 | B1 * | 8/2010 | Subramanian et al. ......... 706/20 |
| 2002/0138417 | A1 | 9/2002 | Lawrence |
| 2002/0194119 | A1 | 12/2002 | Wright et al. |
| 2003/0093366 | A1 | 5/2003 | Halper et al. |
| 2003/0097330 | A1 | 5/2003 | Hillmer et al. |
| 2003/0191709 | A1 | 10/2003 | Elston et al. |
| 2004/0039688 | A1 | 2/2004 | Sulkowski et al. |
| 2005/0055373 | A1 | 3/2005 | Forman |
| 2005/0131873 | A1 | 6/2005 | Fan et al. |
| 2006/0020814 | A1 | 1/2006 | Lieblich et al. |
| 2006/0181411 | A1 | 8/2006 | Fast et al. |
| 2006/0218169 | A1 | 9/2006 | Steinberg et al. |
| 2007/0192167 | A1 | 8/2007 | Lei et al. |
| 2007/0239606 | A1 | 10/2007 | Eisen |
| 2008/0134236 | A1 | 6/2008 | Iijima et al. |
| 2009/0192855 | A1 * | 7/2009 | Subramanian et al. ........... 705/7 |

OTHER PUBLICATIONS

Chan, Lipchen Alex et al., "Automatic target detection using dualband infrared imager", Acoustics, Speech, and Signal PICASSP'00. Proceedings, 2000 IEEE International Conference, pp. 2286-2289 (Jun. 9, 2000).

Chatterjee, Chanchal et al., "Self-Organizing Algorithms for Generalized Eigen-Decomposition", IEEE Transactions on Neural Networks, vol. 8, No. 6, pp. 1518-1530 (Nov. 1997).

Chen, Yupeng et al., "High Resolution Adaptive Bearing Estimation Using A Complex-Weighted Neural Network", IEEE, 0-7803-0532-9/92, pp. II-317-IIII-320 (1992).

Mehrotra, Kishan et al., "Elements of Artificial Neural Networks", MIT Press, pp. 11, 25, 71 76, 85-87, 157, 170-171 (1997).

Wong, A.S.Y. et al., "A Unified Sequential Method for PCA", IEEE, pp. 583-586 (1999).

Tsai, Chieh-Yuan, et al., "A Dynamic Web Service based Data Mining Process System", Proceedings of the 2005 The Fifth International Conference on Computer and Information Technology, pp. 1033-1039 (2005).

Zhang, Tiezhu et al., "Study on the Application of Dynamic Balanced Scorecard in the Service Industry", 2008 International Conference on Intelligent Computation Technology and Automation, Digital Object Identifier: 10.1109/ICICTA.2008.359, pp. 1158-1162 (2008).

Abdel-Wahhab, O. et al., "Image compression using multi-layer neural networks,", Proceedings of the Second IEEE Symposium on Computers and Communications, vol. 144, Issue 5, pp. 307-312 (Oct. 1997).

Almgren, Magnus et al., "Using Active Learning in Intrusion Detection," Proceedings of the 17th IEEE Computer Security Foundations Workshop, 11 pp. (2004).

Andras, Peter, "The Equivalence of Support Vector Machine and Regularization Neural Networks," Neural Processing Letters, 65, pp. 97-104 (2002).

Gabrys, Bogdan et al., "Combining labeled and unlabelled data in the design of pattern classification systems," International Journal of Approximate Reasoning, 35, pp. 251-273 (2004).

Gunter, Simon, "Multiple Classifier Systems in Offline Cursive Handwriting Recognition," cover page and p. 4 (2004).

Hawkins, Simon et al., "Outlier Detection Using Replicator Neural Networks," Proceedings of the Fifth International Conference and Data Warehousing and Knowledge Discovery, 10 pp. (2002).

Hinterseer, Kris, "The Wolfsberg Anti-Money Laundering Principles," Journal of Money Laundering Control, vol. 5, No. 1 pp. 25-41 (Summer 2001).

Lazarevic, Aleksandar et al., "Feature Bagging for Outlier Detection," Research Track Paper, pp. 157-166.

Miyazaki, Anthony D. et al., "Internet Privacy and Security: An Examination of Online Retailer Disclosures," Journal of Public Policy & Marketing, vol. 19, No. 1, pp. 54-61 (Spring 2000).

Pelleg, Dan et al., "Active Learning for Anomaly and Rare-Category Detection," School of Computer Science, Carnegie-Mellon University, 8 pp.

West, David et al., "Neural network ensemble strategies for financial decision applications," Computers & Operations Research, 32, pp. 2543-2559 (2005).

Williams, Graham et al., "A Comparative Study of RNN for Outlier Detection in Data Mining," Proceedings of the 2002 IEEE International Conference on Data Mining 12 pp. (2002).

Credit Technologies, Inc.: News and Press Center, http://www.credit-technologies.com/news_centerasp, 19 pp.

\* cited by examiner

COMPUTER-IMPLEMENTED MODELING SYSTEMS AND METHODS FOR ANALYZING AND PREDICTING COMPUTER NETWORK INTRUSIONS

CROSS-REFERENCE TO RELATED APPLICATIONS

This application claims priority to and the benefit of U.S. Application Ser. No. 60/902,378, (entitled "Computer-Implemented Modeling Systems and Methods for analyzing Computer Network Intrusions" and filed on Feb. 20, 2007), of which the entire disclosure (including any and all figures) is incorporated herein by reference.

This application contains subject matter that may be considered related to subject matter disclosed in: U.S. Application Ser. No. 60/902,380, (entitled "Computer-Implemented Semi-supervised Learning Systems And Methods" and filed on Feb. 20, 2007); U.S. Application Ser. No. 60/902,379, (entitled "Computer-Implemented Systems and Methods For Action Determination" and filed on Feb. 20, 2007); U.S. Application Ser. No. 60/902,381, (entitled "Computer-Implemented Guided Learning Systems and Methods for Constructing Predictive Models" and filed on Feb. 20, 2007); U.S. Application Ser. No. 60/786,039 (entitled "Computer-Implemented Predictive Model Generation Systems And Methods" and filed on Mar. 24, 2006); U.S. Application Ser. No. 60/786,038 (entitled "Computer-Implemented Data Storage For Predictive Model Systems" and filed on Mar. 24, 2006); and to U.S. Provisional Application Ser. No. 60/786,040 (entitled "Computer-Implemented Predictive Model Scoring Systems And Methods" and filed on Mar. 24, 2006); of which the entire disclosures (including any and all figures) of all of these applications are incorporated herein by reference.

GOVERNMENT INTERESTS

This invention was made with US Naval Research Laboratory support under N00173-06-P-2001 awarded by the US Naval Research Laboratory. The Government has certain rights in the invention.

TECHNICAL FIELD

This document relates generally to computer network intrusion analysis and more particularly to unsupervised modeling systems and methods for analyzing computer network intrusions.

BACKGROUND

As the Internet has become more widely used, it has also created new risks for corporations and other types of organizations. Breaches of computer security by hackers and intruders and the potential for compromising sensitive information are a very real and serious threat. The risk is further compounded by the difficulty in determining from the many daily accesses of an organization's network or networks what constitutes legitimate network accesses (e.g., employees accessing their organization's network for work-related purposes, etc.) versus what constitutes malicious network accesses. Examples of malicious network accesses include attempts to access sensitive and confidential information that is contained within an organization's network (e.g., for fraudulent purposes) as well as an attempt to place a virus within the network. Current approaches have difficulty in discerning legitimate network accesses from malicious network accesses.

SUMMARY

In accordance with the teachings provided herein, systems and methods for operation upon data processing devices are provided for analyzing activities associated with accesses of a computer network. As an example, a computer-implemented method and system can be configured to receive data related to the activities associated with the accesses of a computer network. The network activities data are segmented into a plurality of network activities segments. The segmented data is used to generate predictive models are for analyzing activities associated with computer networks.

As another example, a computer-implemented method and system can be configured to receive data related to the activities associated with accesses of a computer network. The network activities data are segmented into a plurality of network activities segments. For each of the network activities segments, an anomaly detection predictive model is generated, wherein the model generation includes generating, for a network activity segment, a predictive model that is a model of the segment. The generated predictive models are for use in analyzing the activities associated with the computer network or other computer networks.

DETAILED DESCRIPTION

Figure 1:
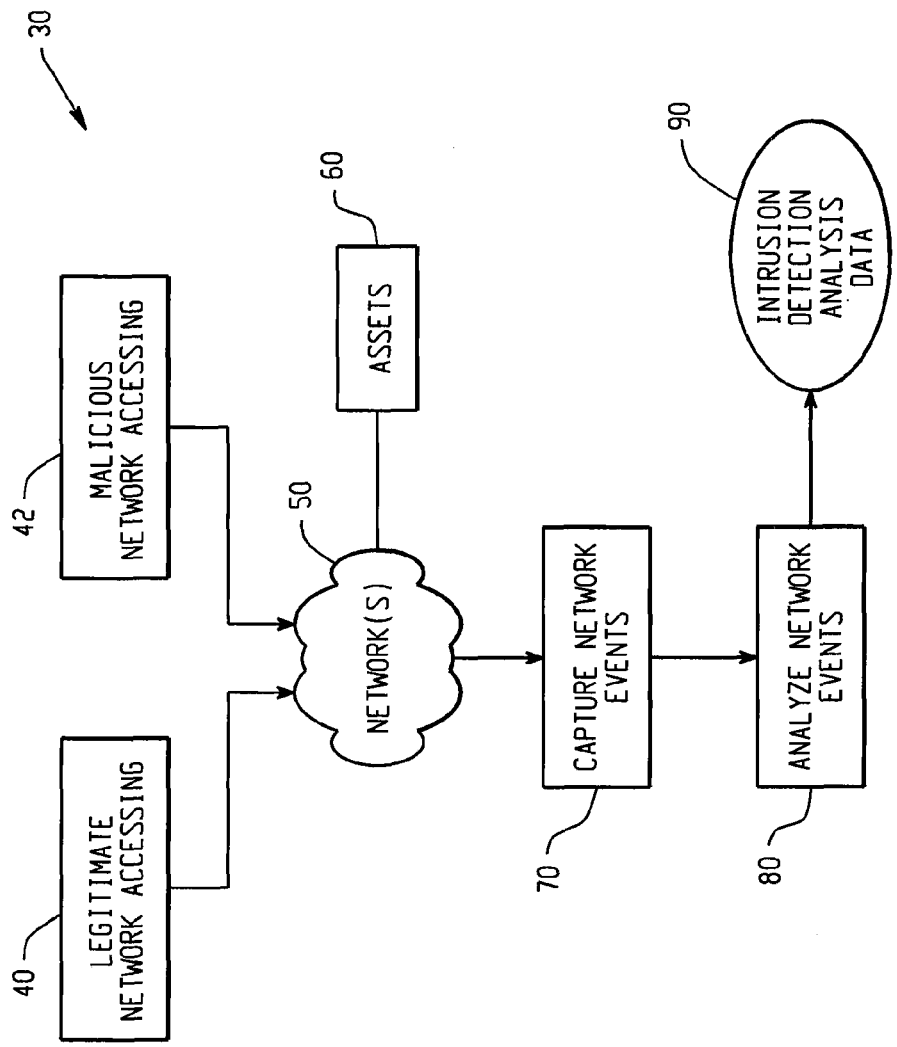
FIG. 1 is a block diagram depicting a computer-implemented system for analyzing activities associated with accesses of one or more computer networks.

FIG. 1 depicts at 30 a computer-implemented system for analyzing activities associated with accesses of one or more computer networks 50. The accessing of a network can include legitimate network accessing 40 as well as malicious network accessing 42. Typically the number of legitimate network accesses overwhelmingly outnumbers any potential malicious network accesses, and as a result, legitimate network accesses tend to obscure the already hidden potential malicious network accesses.

Malicious network accessing 42 can take many different forms, such as a single intrusion to access or steal assets 60 that are available via the network 50. As another example, a malicious network accessing 42 can involve low and slow intrusions. These attacks (or portscans), usually performed by skilled intruders, are characterized by their lengthy duration (possibly weeks or months at a time), precision, and methodical execution. Usually these attacks are intended to gather information about points of weakness in the network for future pervasive and possibly more malicious purposes.

The assets 60 may be a primary goal of the malicious network accessing 42. The assets 60 can include confidential or sensitive information as well as access to proprietary applications that are on the network 50.

To assist in detecting malicious network accessing 42, process 70 captures network event information regarding any accesses of the network 50, such as accesses from origins external to the network 50. Process 80 analyzes the network events and provides intrusion detection analysis data 90 for use in sifting through the many network events to locate potential malicious network accessing(s) 42.

Figure 2:
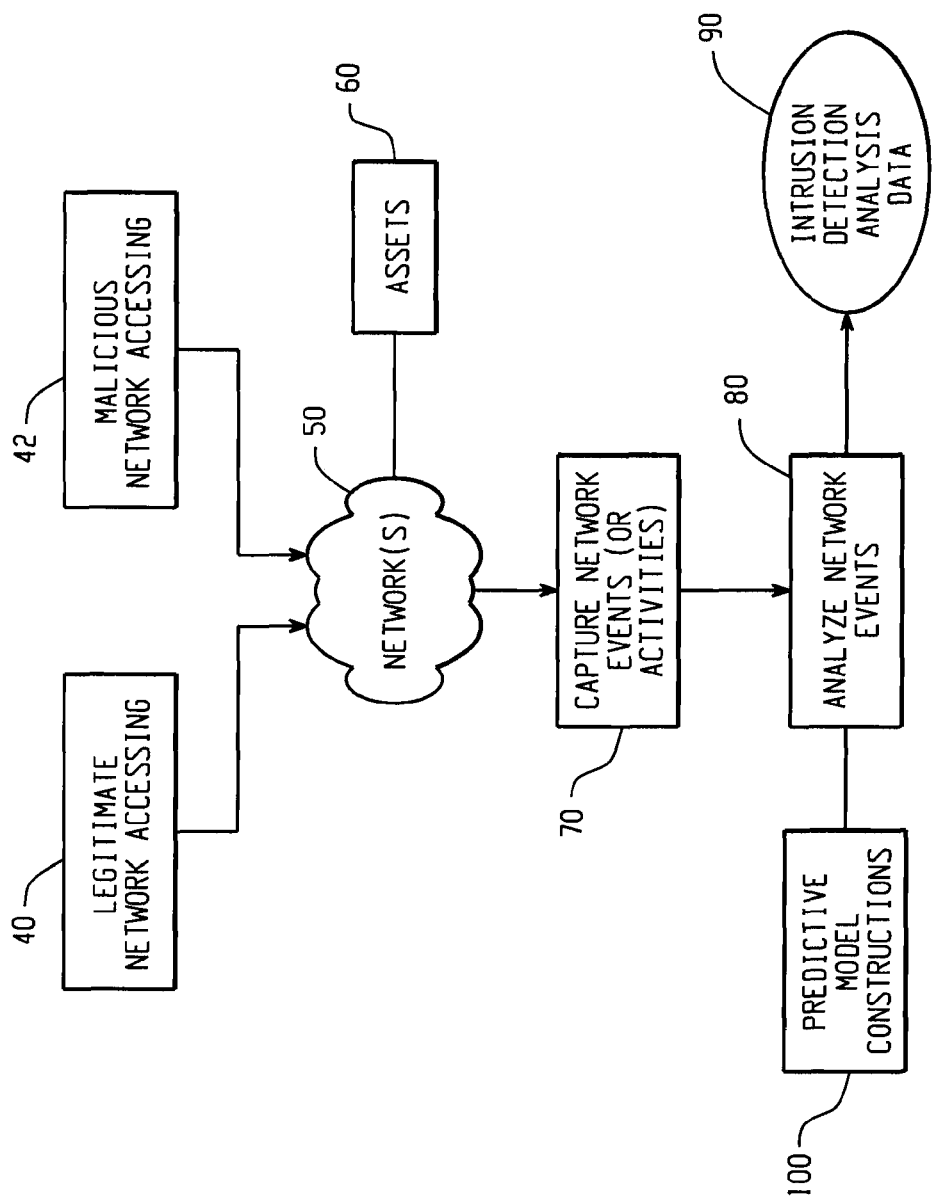
FIG. 2 is a block diagram depicting construction of predictive models for use in analyzing network events.

FIG. 2 illustrates that the network event analysis process 80 uses process 100 to construct models. More specifically, process 100 constructs models for predicting which of the many network accesses constitute malicious network accessing 42. Many different types of predictive models can be constructed by process 100. For example, neural network predictive models can be constructed such as by the mechanism depicted in FIG. 3.

Figure 3:
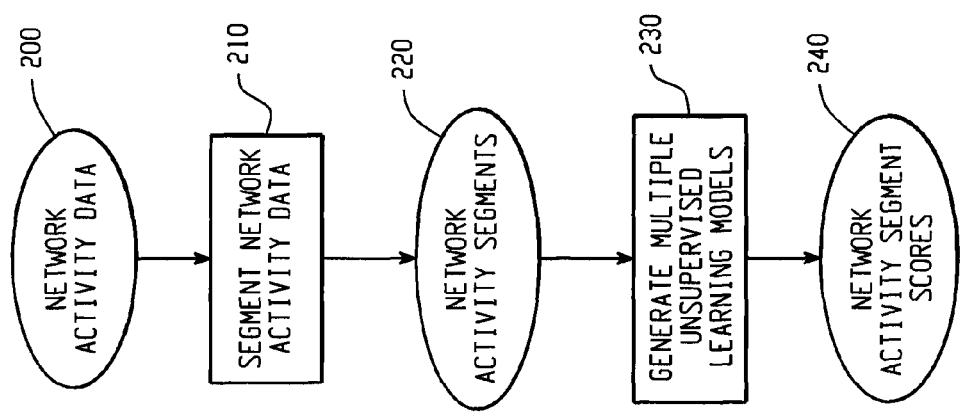
FIG. 3 is a flow chart depicting construction of predictive models.

With reference to FIG. 3, process 210 processes network activity data 200 in order to generate network activity segments 220. The segmentation operations performed by process 210 can include separating into different segments the network traffic information based upon the type of access (e.g. hypertext transfer protocol (HTTP) versus file transfer protocol (FTP)).

For each of the network activities segments, a predictive model is generated at process 230 to assist in predicting anomalous network behavior within the model's associated network activity segment. The models generated via process 230 can be unsupervised learning models, such as compression neural networks (e.g., nonlinear replicator neural networks which are generally known in the art and discussed in such references as: S. Hawkins, H. X. He, G. J. Williams, and R. A. Baxter "Outlier detection using replicator neural networks," Proceedings of the Fifth International Conference and Data Warehousing and Knowledge Discovery 2002; G. J. Williams, R. A. Baxter, H. X. He, S. Hawkins, and L. Gu "A comparative study of RNN for outlier detection in data mining," Proceedings of the 2002 IEEE International Conference on Data Mining; and O. Abdel-Wahhab and M. Fahmy, "Image compression using multi-layer neural networks," Proceedings of the 2nd IEEE Symposium on Computers and Communications (ISCC 1997)).

A predictive model produces indicators (e.g., segment scores 240) for its associated segment. The scores 240 are used in analyzing which activities associated with the computer network may constitute anomalous behavior. A segment score is indicative of how anomalous a computer network access may be. As an example, the scoring mechanism can be configured such that the higher the score the more likely a particular network activity is anomalous and possibly constituting a malicious network access. In this way, the scoring mechanism is also an indicator of the degree of uncertainty of how anomalous a computer network access may be.

Figure 4:
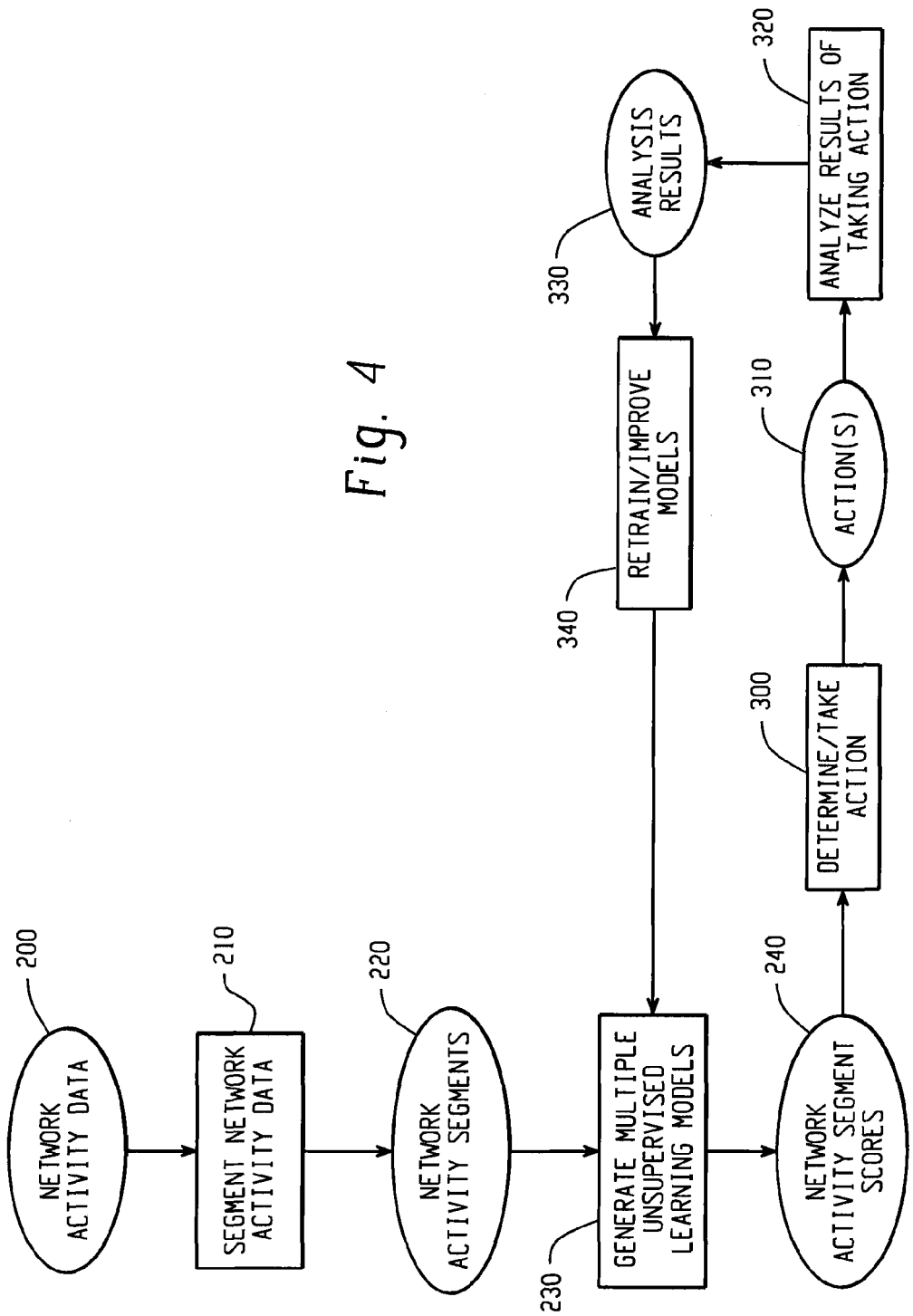
FIG. 4 is a flow chart depicting use of network activity segment scores to improve one or more predictive models.

The scores 240 generated by the models can then be used in many different ways for the detection of network intrusions. As an illustration, FIG. 4 shows that the network activity segment scores 240 can be used to improve one or more of the initial models generated by process 230.

To assist in model improvement, the scores 240 indicate which activities should be scrutinized to determine whether they are malicious activities. This determination of what activities should be acted upon based upon the scores 240 is performed at process 300. After the actions 310 are completed (e.g., manually and/or using additional detection tools to investigate the true nature of an anomalous network event), the outcomes of taking the action are analyzed at process 320. Process 320 generates analysis results 330, such as determining which network events that triggered relatively high anomalous scores actually turned out to be a legitimate network event or malicious network event. The analysis results 330 are funneled back into the model building process so that the models can be retrained and improved via process 340.

Figure 5:
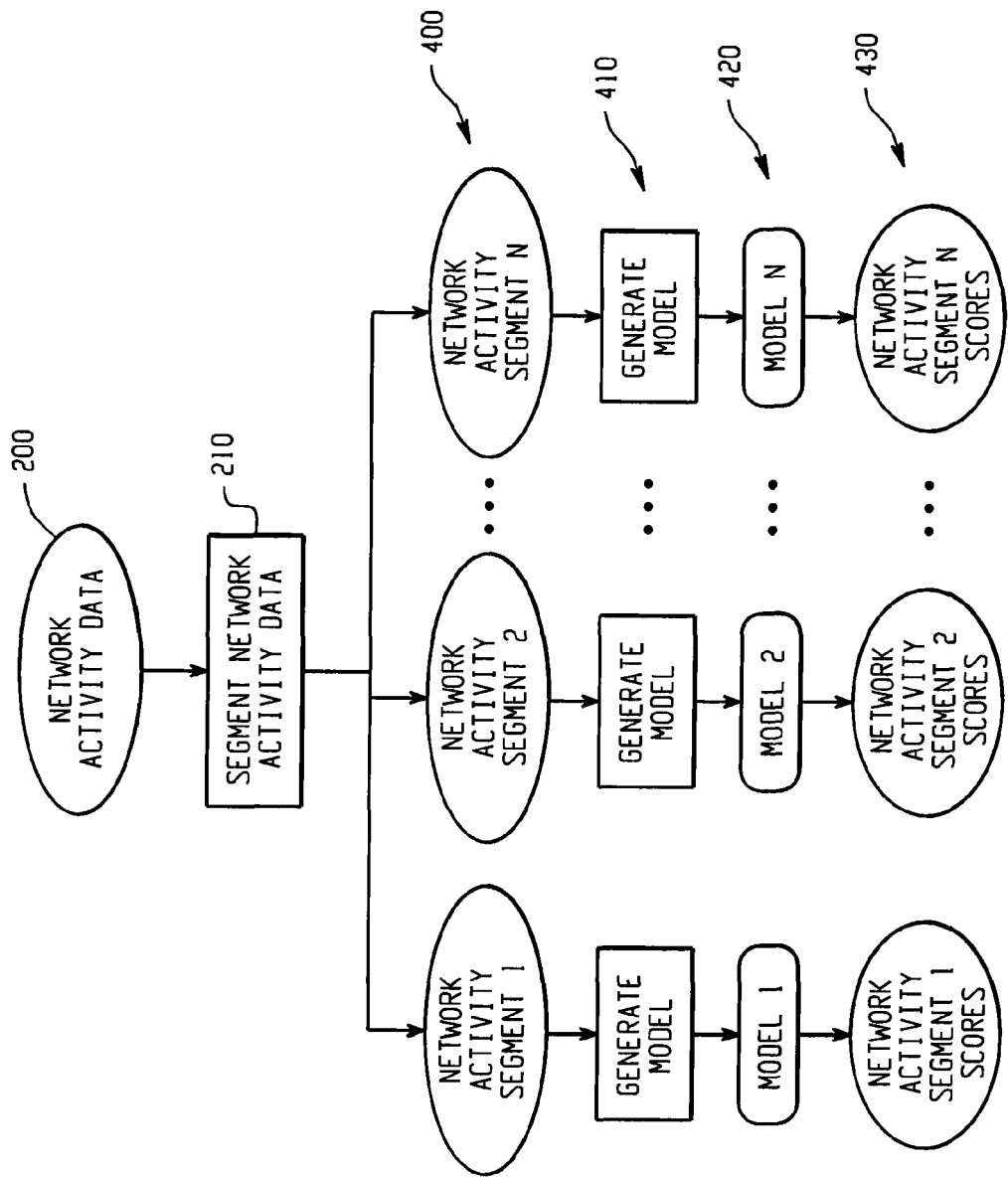
FIG. 5 is a flow chart depicting segmentation of network activity data.

FIG. 5 illustrates that process 210 segments network activity data 200 into multiple network activities segments 400. Depending upon what network activity segments are to be analyzed, process 210 examines the input network activity data 200 to determine which segment a particular network activity entry belongs. For example, two different types of network traffic, HTTP and FTP traffic, may wish to be examined and segmented. Accordingly, process 210 would examine the input network activity data 200 to determine whether a particular network activity entry is an HTTP network activity-related entry or an FTP network activity-related entry. If it is an HTTP network activity-related entry, then process 210 places the entry into a first segment. If it is an FTP network activity-related entry, then processed 210 places the entry into a second segment.

After the segments 400 have been generated, model generation operations 410 construct models 420 for each other the segments 400. It should be understood that similar to the other processing flows described herein, the steps and the order of the steps in the flow of this figure may be altered, modified, removed and/or augmented and still achieve the desired outcome. As an illustration, The model generation operations 410 may be performed in parallel or in serial fashion depending upon the desired performance goals.

Each of the models 420 acts as a predictor of anomalous activity for that model's respective segment 400. For example, a first model is generated in order to act as a predictor for a first segment, a second model is generated in order to act as a predictor for a second segment, etc.

The completion of the training of the models 420 results in network activity segment scores 430 being generated. The scores act as an indicator of how anomalous a particular entry is within the segment. For example, the first model generates network activity scores for the first segment's entries that indicate for the entries how anomalous an entry is.

Figure 6:
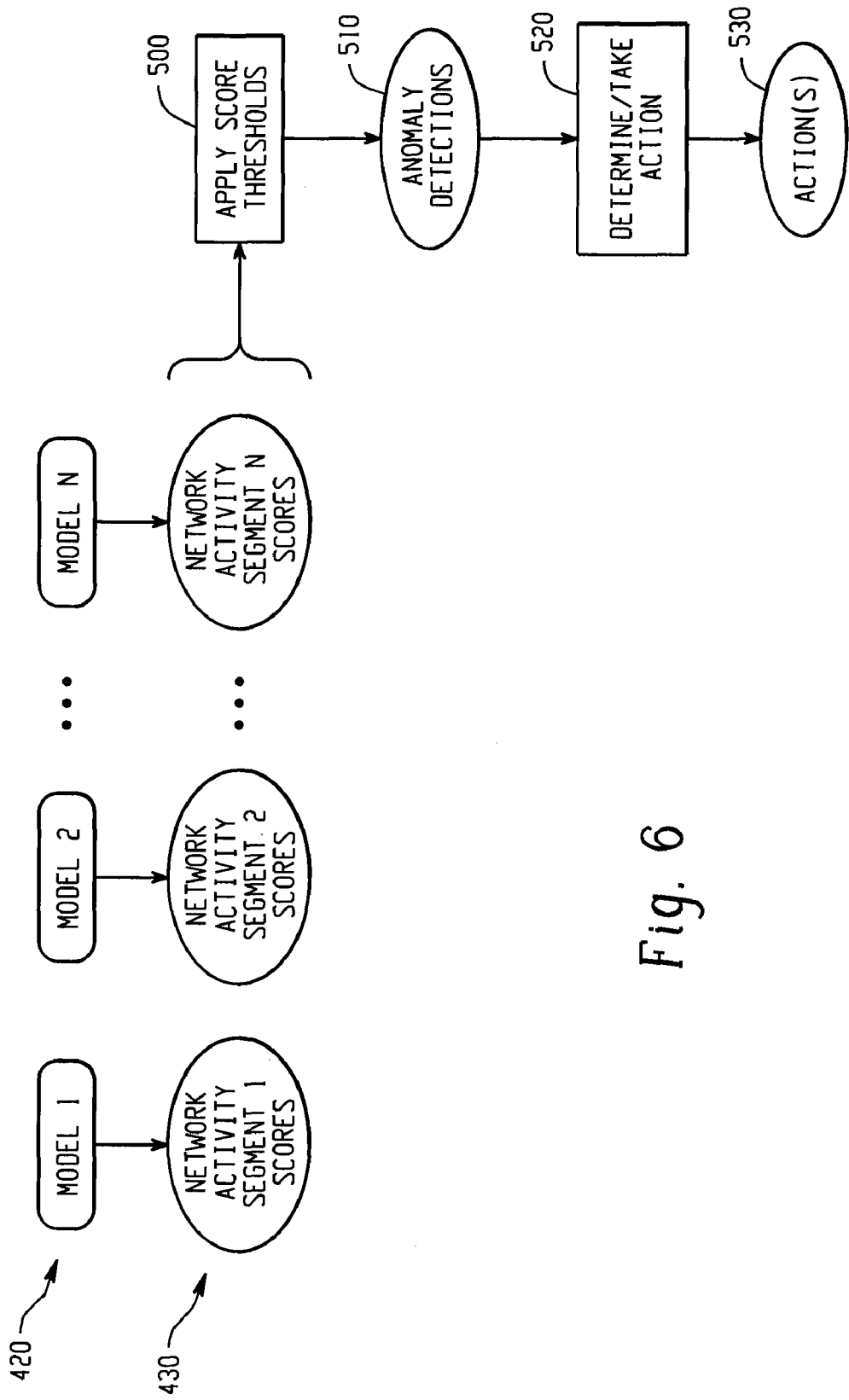
FIG. 6 is a flow chart depicting examination of network activity segment scores with respect to scoring thresholds.

With reference to FIG. 6, the network activity segment scores 430 are examined by process 500 with respect to pre-specified scoring thresholds. Those scores that satisfy a scoring threshold are considered anomaly detections 510. Actions are then taken by process 520 with respect to the anomaly detections 510. In other words, the multiple network accesses have been reduced to a smaller set of accesses so that an action can be taken to determine a more accurate assessment (e.g., the true nature) of the detected anomalies 510.

Figure 7:
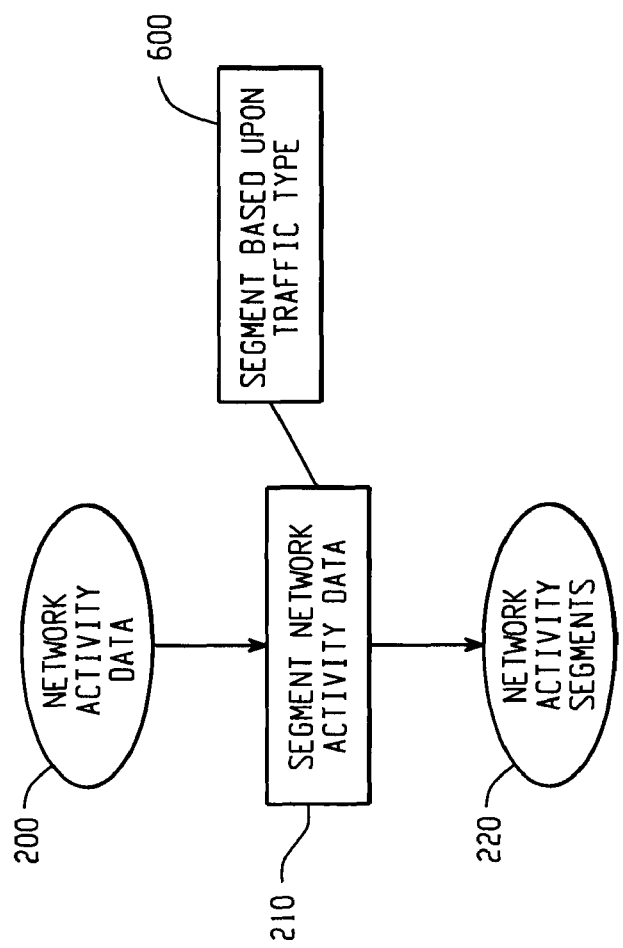
FIG. 7 is a flow chart depicting segmentation being performed upon input network activity data.

FIG. 7 illustrates an operational scenario in which segmentation 210 may be performed upon the input network activity data 200. In this example, segmentation is performed based upon traffic type 600. Accordingly, process 210 generates network activity segments of differing traffic types.

Figure 8:
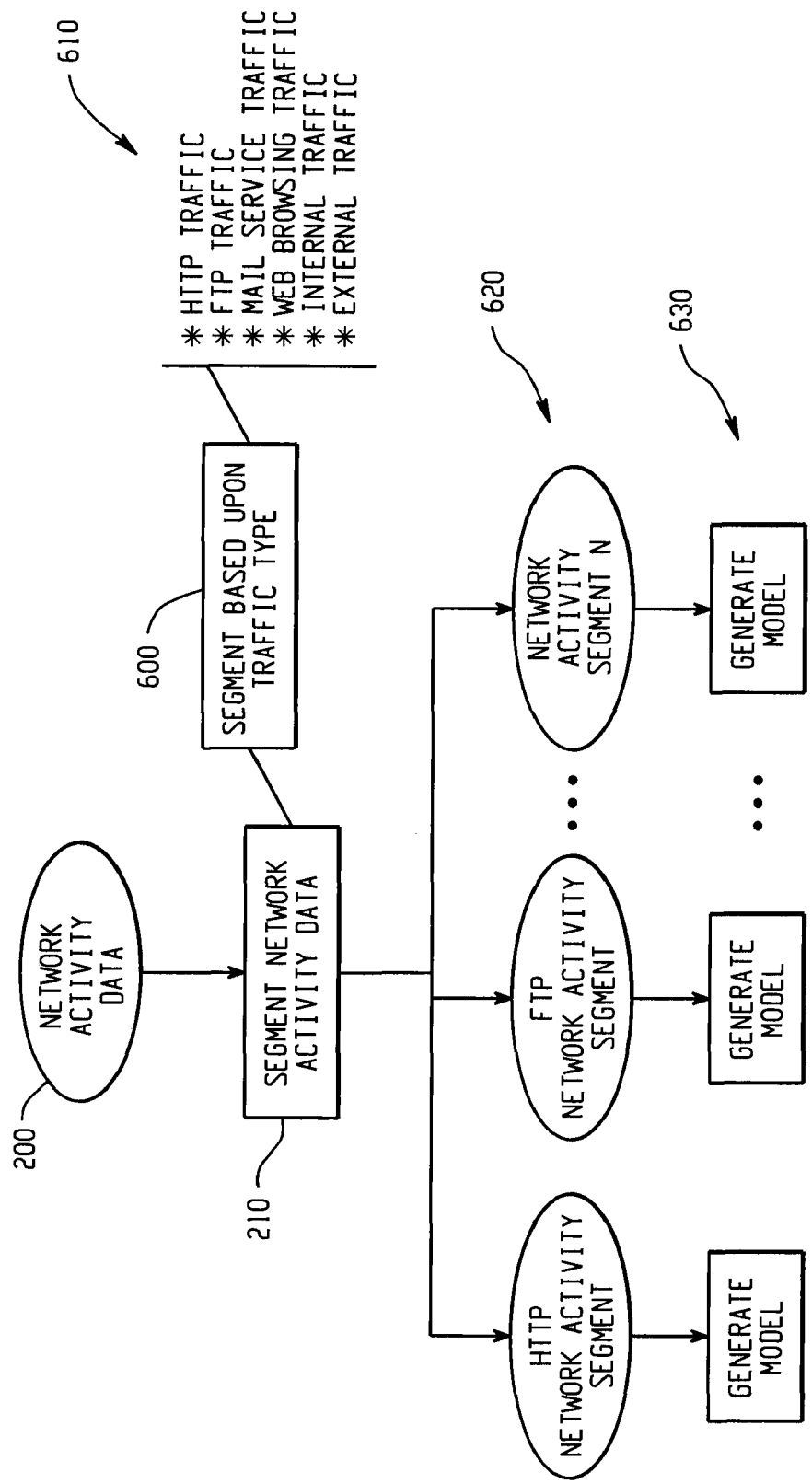
FIG. 8 is a flow chart depicting generation of segments for different types of traffic.

To continue this example, FIG. 8 illustrates different types of traffic at 610 for use in generating segment 620. In this illustration, six different types of traffic segments are generated by segmentation process 210: an HTTP traffic segment, an FTP traffic segment, a mail service traffic segment, a web browsing traffic segment, an internal traffic segment, and an external traffic segment. For each of these different segments 620, a model is generated via processes 630.

A diverse set of variables can form the basis for segmentation. For example, static or non-time based variables can be used as the basis for forming segments. A static variable can be network access at a single point in time. In addition to or in place of, time-based variables can be used as a basis for forming segments for which predictive models are to be generated. A time-based variable can include stringing together network accesses that occur over a period of time and that originate from the same entity.

Figure 9:
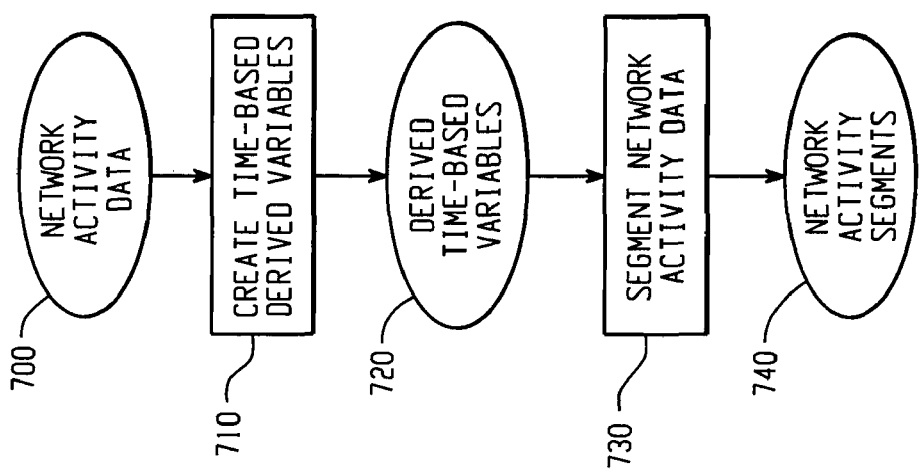
FIG. 9 is a flow chart depicting use of time-based derived variables within a network intrusion detection system.

The use of time-based derived variables within a network intrusion detection system is illustrated in FIG. 9. With reference to FIG. 9, process 710 creates time-based derived variables from the network activity data 700. Process 730 examines the derived time-based variable 720 in order to determine to which segment 740 a derived variable belongs. For the segments, predictive models will be generated.

Figure 10:
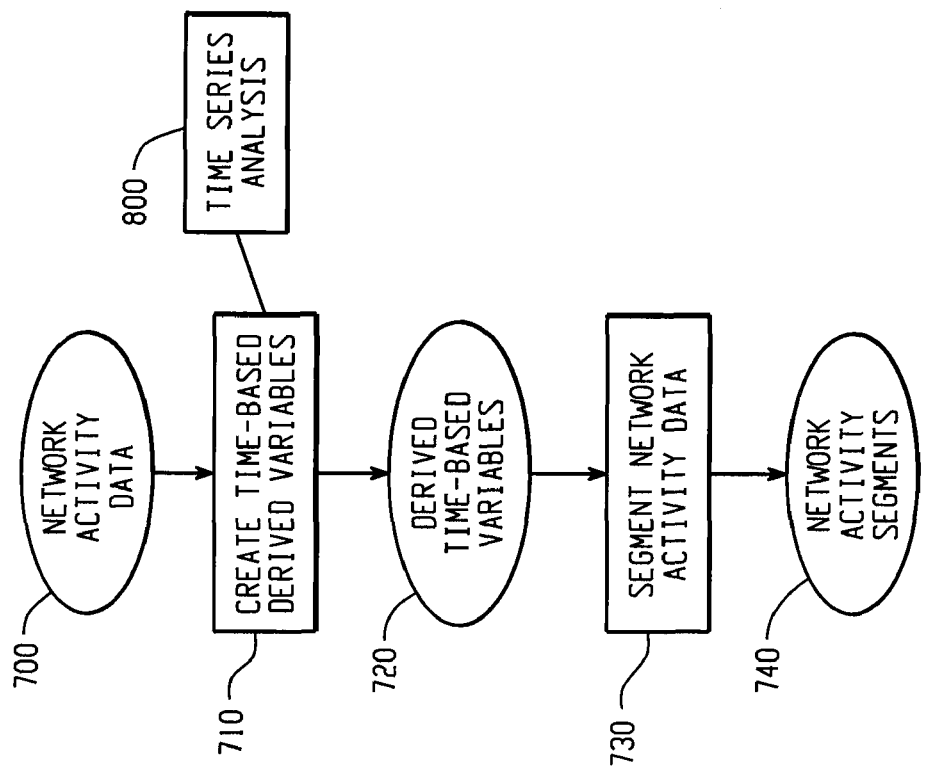
FIG. 10 is a flow chart depicting use of time series analysis when creating time-based derived variables.

FIG. 10 depicts that process 710 can perform time series analysis 800 when creating time-based derived variables 720. Time series analysis 800 examines network activities for patterns of trend, seasonality, and/or cycle. Any detected time-varying patterns for a set of related network activities can be used as a time-based variable and can be placed in a segment for which a predictive model can be constructed. Trend analysis can also be helpful to see if a greater number of problems (e.g. anomalous behavior) is occurring more frequently with respect to a particular type of segment. In such a situation, network intrusion detection system can perform different actions, such as lowering the scoring thresholds that are applied to the segment.

Figure 11:
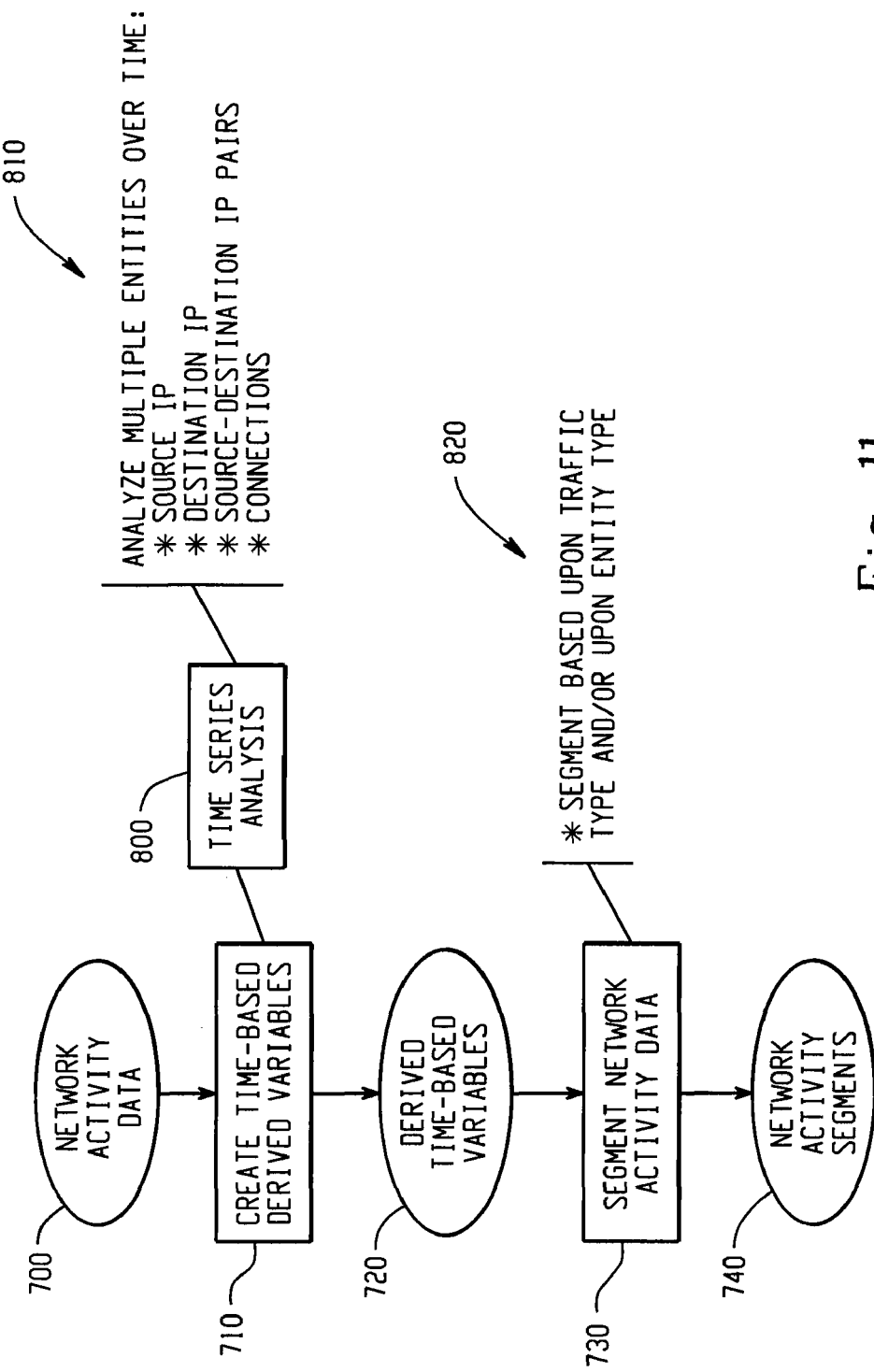
FIG. 11 is a flow chart depicting use of time series analysis to analyze multiple entities over time.

FIG. 11 illustrates at 810 that the time series analysis 800 can analyze multiple entities over time. The multiple entities can be examined over time with respect to source IP address, destination IP address, source-destination IP address pairs, connections, etc. FIG. 11 also illustrates at 820 that segmentation process 730 can segment based upon traffic type and/or upon entity type. This allows for a rich and diverse variety of segments when constructing predictive models for analyzing network intrusions.

Figure 12:
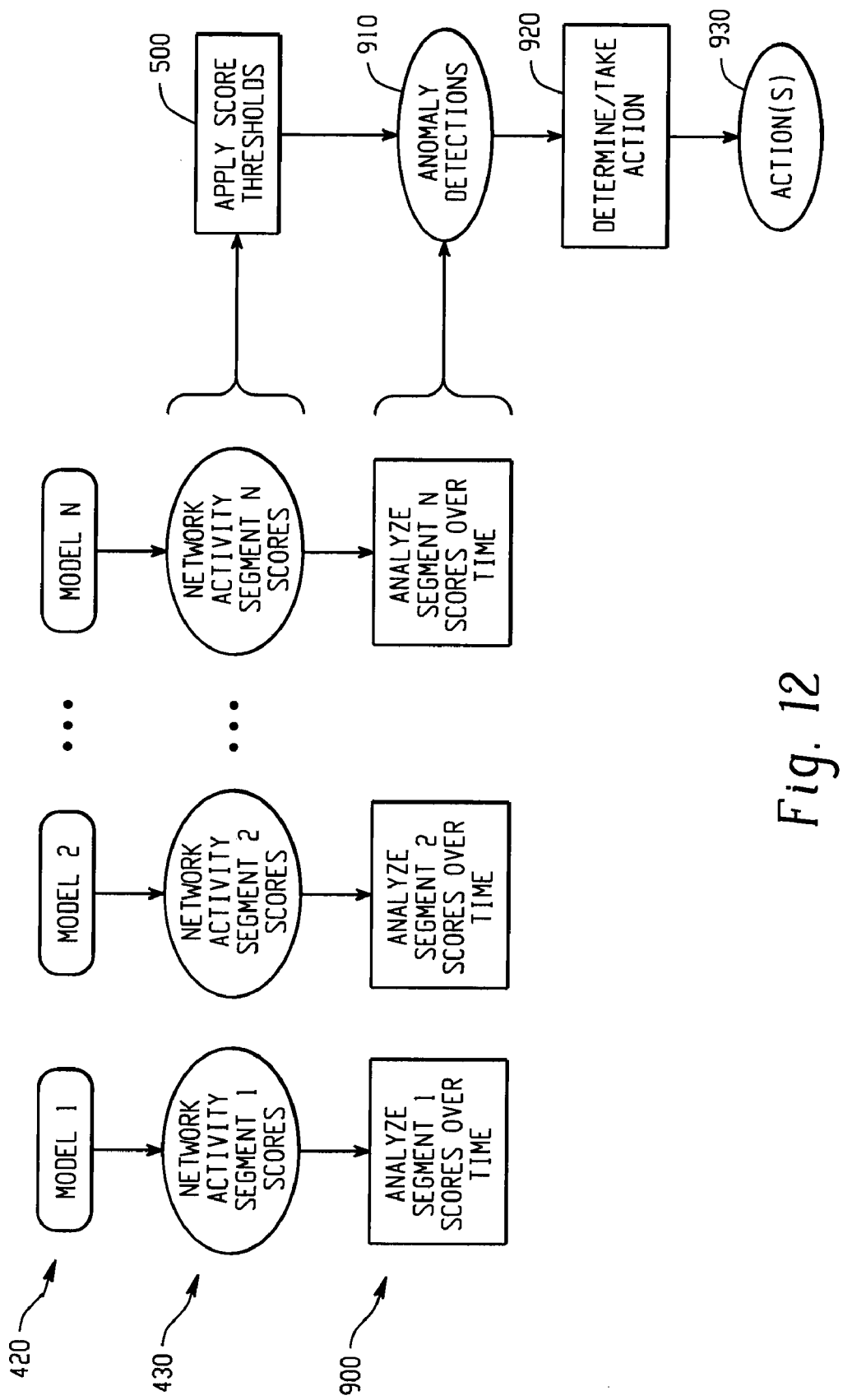
FIG. 12 is a flow chart depicting analysis of segment scores over time in order to determine which of the network activities should be categorized as anomaly detections.

FIG. 12 illustrates at 900 that analysis of segment scores over time can also be performed to determine which of the network activities should be categorized as anomaly detections 910. This may be performed in conjunction with or in place of the scoring thresholds process 500.

Figure 13:
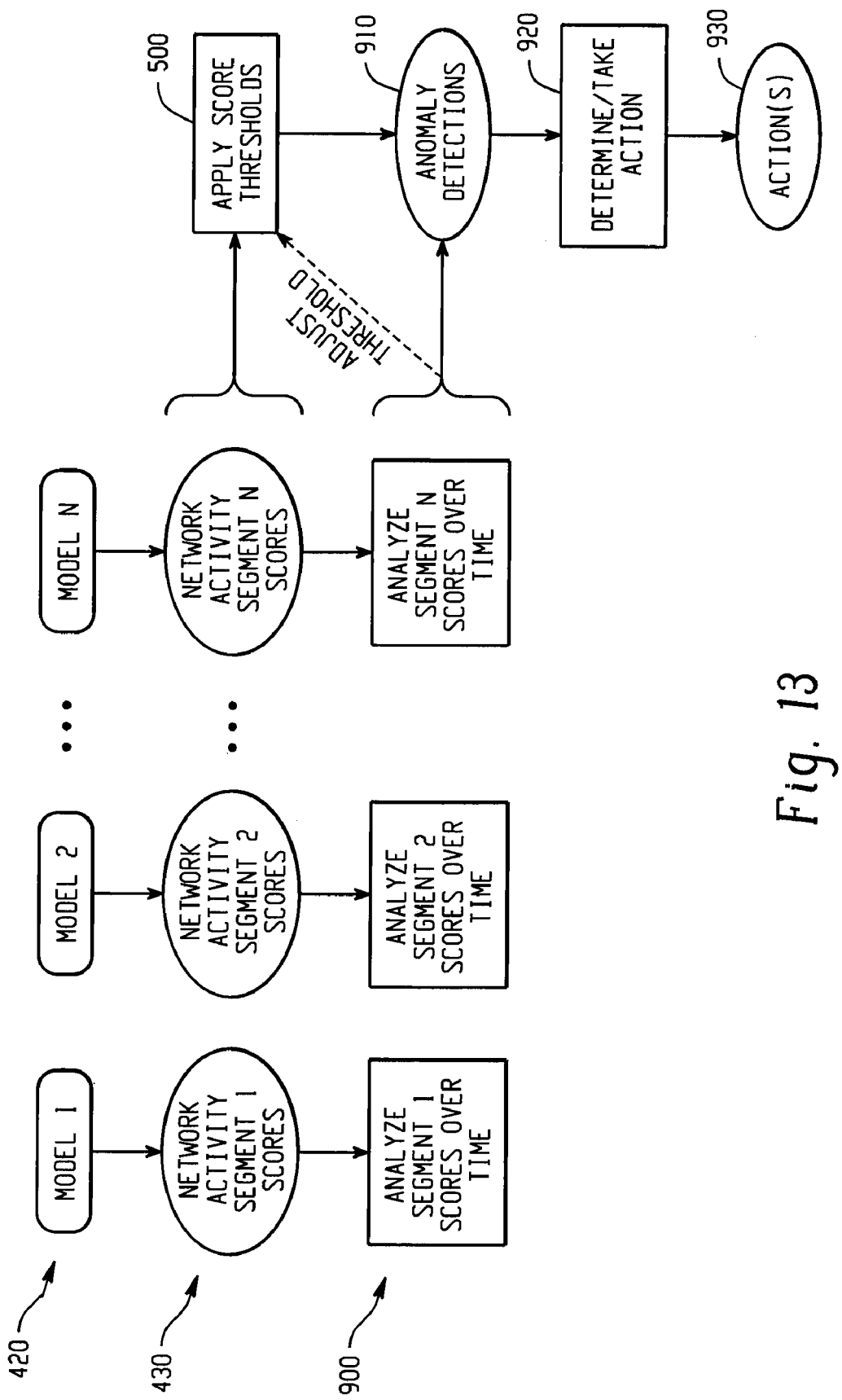
FIG. 13 is a flow chart depicting the analysis of segment scores over time resulting in adjustment of scoring threshold (s).

As illustrated in FIG. 13, the analysis 900 of the segment scores over time can result in an adjustment of the scoring thresholds that are applied to a segment. For a segment deemed as problematic based upon analysis of segment scores over time, the segment's threshold can be lowered so as to include more entries from the problematic segment in the set of anomaly detections 910. This results in a greater amount of analysis of the true nature of the segment's entries, such as through applying manual and/or more sophisticated (and time intensive) network intrusion analysis. Conversely, for a segment deemed not problematic based upon analysis of segment scores over time, the segment's threshold can be raised so as to include fewer entries from the non-problematic segment in the set of anomaly detections 910. This results in a less amount of analysis for this segment and thus may free up additional resources to scrutinize more problematic segments.

Figure 14:
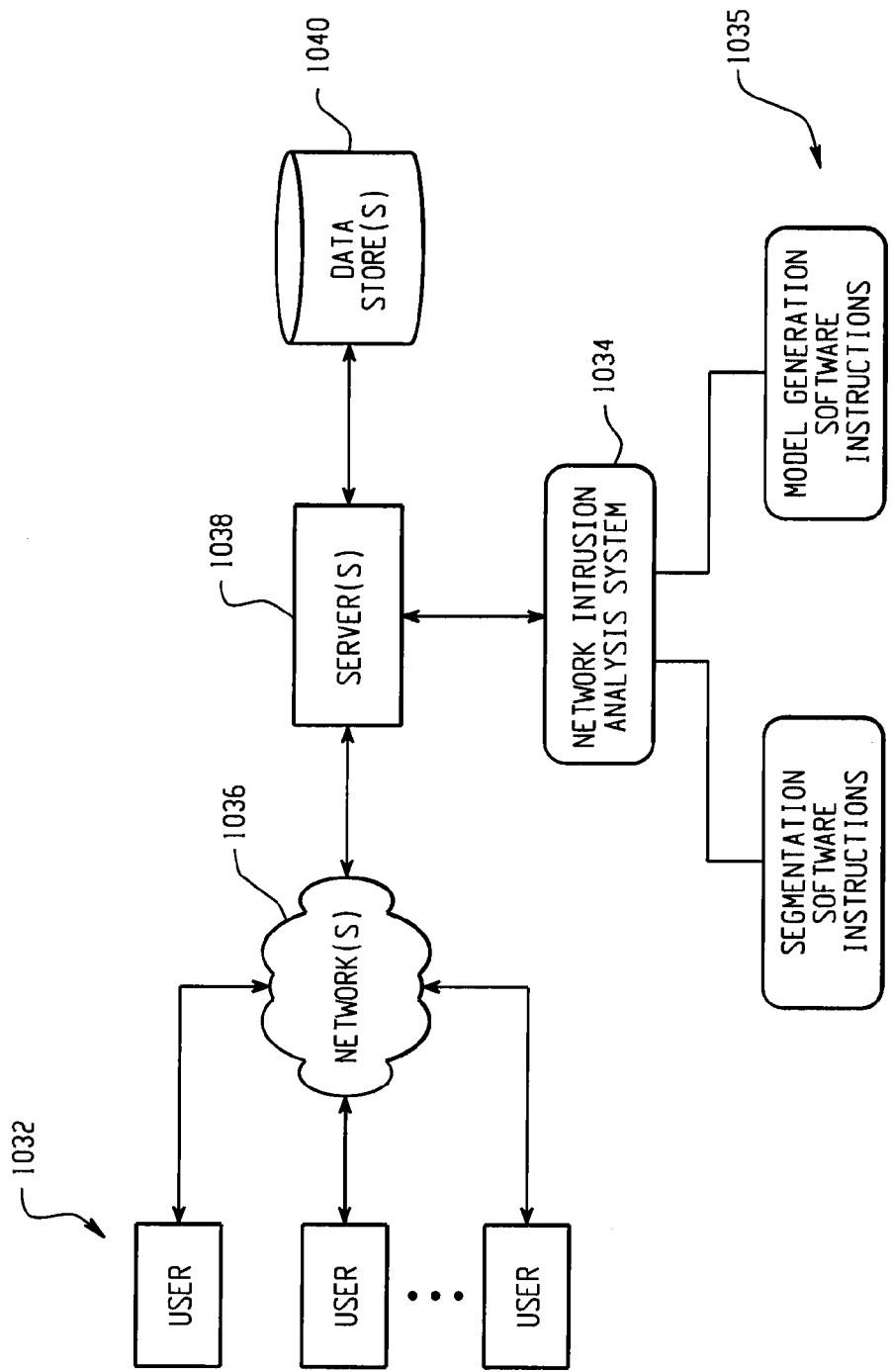
FIG. 14 is a block diagram depicting a networked environment wherein users can interact with a network intrusion analysis system.

While examples have been used to disclose the invention, including the best mode, and also to enable any person skilled in the art to make and use the invention, the patentable scope of the invention is defined by claims, and may include other examples that occur to those skilled in the art. Accordingly the examples disclosed herein are to be considered non-limiting. As an illustration, the systems and methods disclosed herein may be implemented on various types of computer architectures, such as for example on a networked system, on a single general purpose computer, etc. As an illustration, FIG. 14 depicts a networked environment wherein users 1032 can interact with a network intrusion analysis system 1034.

The users 1032 can interact with the network intrusion analysis system 1034 through a number of ways, such over one or more networks 1036. A server 1038 accessible through the network(s) 1036 can host the network intrusion analysis system 1034. The same server or different servers can contain various software instructions 1035 (e.g., instructions for segmenting the network activities data, instructions for generating anomaly detection predictive models, etc.) or modules of the network intrusion analysis system 1034. Data store(s) 1040 can store the data to be analyzed as well as any intermediate or final data calculations and data results.

The network intrusion analysis system 1034 can be a web-based analysis and reporting tool that provides users flexibility and functionality for performing network intrusion problem identification. Moreover, the network intrusion analysis system 1034 can be used separately or in conjunction with other software programs, such as other network intrusion detection techniques.

Figure 15:
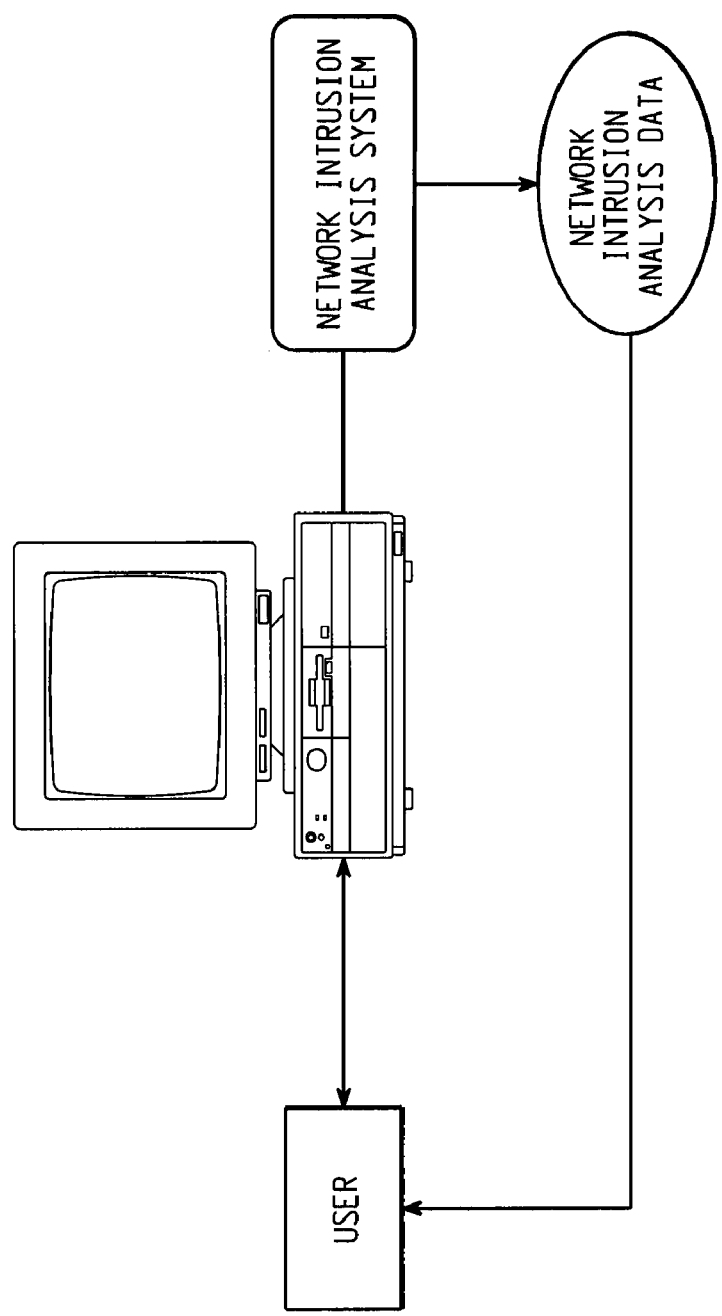
FIG. 15 is a block diagram depicting a stand-alone computer environment wherein a user can interact with a network intrusion analysis system.

It should be understood that the network intrusion analysis system 1034 can be implemented in other ways, such as on a stand-alone computer for access by a user as shown in FIG. 15.

It is further noted that the systems and methods may include data signals conveyed via networks (e.g., local area network, wide area network, internet, combinations thereof, etc.), fiber optic medium, carrier waves, wireless networks, etc. for communication with one or more data processing devices. The data signals can carry any or all of the data disclosed herein that is provided to or from a device.

Additionally, the methods and systems described herein may be implemented on many different types of processing devices by program code comprising program instructions that are executable by the device processing subsystem. The software program instructions may include source code, object code, machine code, or any other stored data that is operable to cause a processing system to perform methods described herein. Other implementations may also be used, however, such as firmware or even appropriately designed hardware configured to carry out the methods and systems described herein.

The systems' and methods' data (e.g., associations, mappings, etc.) may be stored and implemented in one or more different types of computer-implemented ways, such as different types of storage devices and programming constructs (e.g., data stores, RAM, ROM, Flash memory, flat files, databases, programming data structures, programming variables, IF-THEN (or similar type) statement constructs, etc.). It is noted that data structures describe formats for use in organizing and storing data in databases, programs, memory, or other computer-readable media for use by a computer program.

The systems and methods may be provided on many different types of computer-readable media including computer storage mechanisms (e.g., CD-ROM, diskette, RAM, flash memory, computer's hard drive, etc.) that contain instructions (e.g., software) for use in execution by a processor to perform the methods' operations and implement the systems described herein.

The computer components, software modules, functions, data stores and data structures described herein may be connected directly or indirectly to each other in order to allow the flow of data needed for their operations. It is also noted that a module or processor includes but is not limited to a unit of code that performs a software operation, and can be implemented for example as a subroutine unit of code, or as a software function unit of code, or as an object (as in an object-oriented paradigm), or as an applet, or in a computer script language, or as another type of computer code. The software components and/or functionality may be located on a single computer or distributed across multiple computers depending upon the situation at hand.

It should be understood that as used in the description herein and throughout the claims that follow, the meaning of "a," "an," and "the" includes plural reference unless the context clearly dictates otherwise. Also, as used in the description herein and throughout the claims that follow, the meaning of "in" includes "in" and "on" unless the context clearly dictates otherwise. Finally, as used in the description herein and throughout the claims that follow, the meanings of "and" and "or" include both the conjunctive and disjunctive and may be used interchangeably unless the context expressly dictates otherwise; the phrase "exclusive or" may be used to indicate situation where only the disjunctive meaning may apply.

It is claimed:

1. A computer-implemented method for analyzing activities associated with accessing a computer network, comprising:
   receiving, using one or more processors, network activity data including one or more activities associated with accessing a computer network;
   segmenting, using the one or more processors, the network activity data into a plurality of network activity segments; and
   generating, using the one or more processors, an anomaly detection predictive model for each network activity segment, wherein each anomaly detection predictive model is used to generate one or more segment scores for a corresponding network activity segment, and wherein each anomaly detection predictive model is used to analyze the one or more segment scores for the corresponding network activity segment over time.

2. The method of claim 1, wherein the computer network includes one or more networks, including wide area network, local area network, wireless network, intranet network, and internet network.

3. The method of claim 1, wherein the network activity data includes one or more legitimate computer network accesses and one or more malicious computer network accesses.

4. The method of claim 3, wherein the one or more malicious computer network accesses are unauthorized and intended to penetrate and access one or more computer assets accessible through the computer network.

5. The method of claim 3, wherein one or more generated compression neural network models are used to identify the one or more malicious computer network accesses.

6. The method of claim 1, wherein each segment score indicates a degree to which network activity data corresponding to a network activity segment is anomalous.

7. The method of claim 6, wherein at least a portion of the one or more segment scores indicates a degree of uncertainty.

8. The method of claim 6, further comprising:
   analyzing, using the one or more processors, each segment score by applying a pre-specified criterion or criteria to identify a subset of network activity data.

9. The method of claim 8, wherein the criterion or criteria include a score threshold.

10. The method of claim 8, wherein one or more actions are performed based upon the subset of network activity data, wherein the one or more actions result in an assessment of which network activity data is malicious, and wherein each anomaly detection predictive model can be retrained based upon the assessment.

11. The method of claim 1, wherein segmenting network activity data includes segmenting based upon a network traffic type.

12. The method of claim 11, wherein network traffic types include http traffic, ftp traffic, mail service traffic, web browsing traffic, internal traffic, and external traffic.

13. The method of claim 1, further comprising:
   generating, using the one or more processors, a plurality of time-based derived variables, wherein the network activity data is segmented based upon the time-based derived variables.

14. The method of claim 13, wherein the network activity data includes network source IP address, network destination IP address, and network source-destination IP pair addresses.

15. The method of claim 13, wherein generating the plurality of time-based derived variables includes using time series analysis.

16. The method of claim 15, wherein the time series analysis determines time dependent behavior associated with the network activity data.

17. The method of claim 1, further comprising:
   generating, using the one or more processors, a plurality of non-time based derived variables, wherein the network activity data is segmented based upon the non-time based derived variables.

18. The method of claim 1, wherein each anomaly detection predictive model is an unsupervised predictive model.

19. The method of claim 17, wherein each anomaly detection predictive model is a compression neural network.

20. A system, comprising:
   one or more processors;
   a computer-readable storage medium containing instructions configured to cause the one or more processors to perform operations, including:
   receiving network activity data including one or more activities associated with accessing a computer network;
   segmenting the network activity data into a plurality of network activity segments; and
   generating an anomaly detection predictive model for each network activity segment, wherein each anomaly detection predictive model is used to generate one or more segment scores for a corresponding network activity segment, and wherein each anomaly detection predictive model is used to analyze the one or more segment scores for the corresponding network activity segment over time.

21. A computer-program product, tangibly embodied in a machine-readable storage medium, including instructions configured to cause a data processing apparatus to:

receive network activity data including one or more activities associated with accessing a computer network;
segment the network activity data into a plurality of network activity segments; and
generate an anomaly detection predictive model for each network activity segment, wherein each anomaly detection predictive model is used to generate one or more segment scores for a corresponding network activity segment, and wherein each anomaly detection predictive model is used to analyze the one or more segment scores for the corresponding network activity segment over time.

22. A method, comprising:
receiving, using one or more processors, network activity data including one or more activities associated with accessing a computer network;
generating, using the one or more processors, a plurality of time-based derived variables using time series analysis;
segmenting, using the one or more processors, the network activity data into a plurality of network activity segments, wherein segmenting is based upon the time-based derived variables; and
generating, using the one or more processors, an anomaly detection predictive model for each network activity segment, wherein each anomaly detection predictive model is used to analyze the network activity data.

23. A system, comprising:
one or more processors;
a computer-readable storage medium containing instructions configured to cause the one or more processors to perform operations, including:
receiving network activity data including one or more activities associated with accessing a computer network;
generating a plurality of time-based derived variables using time series analysis;
segmenting the network activity data into a plurality of network activity segments, wherein segmenting is based upon the time-based derived variables; and
generating an anomaly detection predictive model for each network activity segment, wherein each anomaly detection predictive model is used to analyze the network activity data.

24. A computer-program product, tangibly embodied in a machine-readable storage medium, including instructions configured to cause a data processing apparatus to:
receive network activity data including one or more activities associated with accessing a computer network;
generate a plurality of time-based derived variables using time series analysis;
segment the network activity data into a plurality of network activity segments, wherein segmenting is based upon the time-based derived variables; and
generate an anomaly detection predictive model for each network activity segment, wherein each anomaly detection predictive model is used to analyze the network activity data.

25. A method, comprising:
receiving, using one or more processors, network activity data including one or more activities associated with accessing a computer network;
generating, using the one or more processors, a plurality of non-time based derived variables;
segmenting, using the one or more processors, the network activity data into a plurality of network activity segments, wherein segmenting is based upon the non-time based derived variables; and
generating, using the one or more processors, an anomaly detection predictive model for each network activity segment, wherein each anomaly detection predictive model is used to analyze the network activity data.

26. A system, comprising:
one or more processors;
a computer-readable storage medium containing instructions configured to cause the one or more processors to perform operations, including:
receiving network activity data including one or more activities associated with accessing a computer network;
generating a plurality of non-time based derived variables;
segmenting the network activity data into a plurality of network activity segments, wherein segmenting is based upon the non-time based derived variables; and
generating an anomaly detection predictive model for each network activity segment, wherein each anomaly detection predictive model is used to analyze the network activity data.

27. A computer-program product, tangibly embodied in a machine-readable storage medium, including instructions configured to cause a data processing apparatus to:
receive network activity data including one or more activities associated with accessing a computer network;
generate a plurality of non-time based derived variables;
segment the network activity data into a plurality of network activity segments, wherein segmenting is based upon the non-time based derived variables; and
generate an anomaly detection predictive model for each network activity segment, wherein each anomaly detection predictive model is used to analyze the network activity data.

* * * * *